(12) United States Patent
Wakimoto et al.

(10) Patent No.: US 12,176,580 B2
(45) Date of Patent: Dec. 24, 2024

(54) SECONDARY BATTERY AND METHOD FOR MANUFACTURING SAME

(71) Applicants: SANYO Electric Co., Ltd., Osaka (JP); Panasonic Corporation, Osaka (JP)

(72) Inventors: Ryoichi Wakimoto, Hyogo (JP); Hiroaki Imanishi, Hyogo (JP); Yukinobu Miyamura, Hyogo (JP)

(73) Assignees: SANYO ELECTRIC CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 493 days.

(21) Appl. No.: 17/634,098

(22) PCT Filed: Sep. 11, 2020

(86) PCT No.: PCT/JP2020/034404
§ 371 (c)(1),
(2) Date: Feb. 9, 2022

(87) PCT Pub. No.: WO2021/060009
PCT Pub. Date: Apr. 1, 2021

(65) Prior Publication Data
US 2022/0352606 A1  Nov. 3, 2022

(30) Foreign Application Priority Data
Sep. 26, 2019  (JP) .................. 2019-174878

(51) Int. Cl.
*H01M 50/00* (2021.01)
*H01M 10/0585* (2010.01)
(Continued)

(52) U.S. Cl.
CPC ....... *H01M 50/54* (2021.01); *H01M 10/0585* (2013.01); *H01M 50/188* (2021.01)

(58) Field of Classification Search
CPC . H01M 50/54; H01M 50/188; H01M 10/0585
See application file for complete search history.

(56) References Cited

U.S. PATENT DOCUMENTS

| 2010/0223780 A1 | 9/2010 | Kondou et al. |
| 2011/0183191 A1 | 7/2011 | Lee et al. |
| (Continued) | | |

FOREIGN PATENT DOCUMENTS

| CN | 202495505 U | 10/2012 |
| CN | 103258985 A | 8/2013 |
| (Continued) | | |

OTHER PUBLICATIONS

Partial Supplemental European Search Report dated Oct. 13, 2022 issued in the corresponding European Patent Application No. 20868150.2.

(Continued)

*Primary Examiner* — Anca Eoff
*Assistant Examiner* — Monique M Wills
(74) *Attorney, Agent, or Firm* — Rimon P.C.

(57) ABSTRACT

Provided is a secondary battery in which an electrode body having a positive electrode tab group on one end thereof is accommodated in a battery case, wherein: a first positive electrode current collector comprises a first region disposed between a sealing plate and the electrode body, and a second region disposed between the electrode body and a first side wall of a rectangular exterior body constituting the battery case; the positive electrode tab group is connected in a folded state to a second positive electrode current collector; and the second positive electrode current collector is welded to the second region.

14 Claims, 14 Drawing Sheets

(51) Int. Cl.
    *H01M 50/188* (2021.01)
    *H01M 50/54* (2021.01)

(56) References Cited

U.S. PATENT DOCUMENTS

| | | |
|---|---|---|
| 2011/0311851 A1 | 12/2011 | Shinoda et al. |
| 2014/0012519 A1 | 1/2014 | Yamada et al. |
| 2014/0234669 A1 | 8/2014 | Byun et al. |
| 2015/0093609 A1 | 4/2015 | Byun |
| 2015/0147637 A1 | 5/2015 | He et al. |
| 2019/0067667 A1 | 2/2019 | Jang et al. |
| 2019/0221825 A1* | 7/2019 | Lee .................. H01M 10/0525 |
| 2020/0251787 A1 | 8/2020 | Shinoda et al. |

FOREIGN PATENT DOCUMENTS

| | | |
|---|---|---|
| CN | 109428042 A | 3/2019 |
| EP | 2783406 B1 | 3/2019 |
| JP | 2014-014881 A | 1/2014 |
| JP | 2015-092507 A | 5/2015 |
| JP | 2019-061779 A | 4/2019 |
| WO | 2019/088053 A1 | 5/2019 |

OTHER PUBLICATIONS

International Search Report and Written Opinion issued in International Patent Application No. PCT/JP2020/034404, dated Nov. 24, 2020, with partial English translation.
Chinese Office Action dated Jan. 1, 2024 issued in the corresponding Chinese Patent Application No. 202080057455.0.
Hearing Notice dated Jan. 18, 2024 issued in the corresponding Indian Patent Application No. 202247007305, with English translation.
Extended European Search Report dated Jan. 26, 2023 issued in the corresponding European Patent Application No. 20868150.2.

* cited by examiner

SECONDARY BATTERY AND METHOD FOR MANUFACTURING SAME

CROSS-REFERENCE OF RELATED APPLICATIONS

This application is the U.S. National Phase under 35 U.S.C. § 371 of International Patent Application No. PCT/JP2020/034404, filed on Sep. 11, 2020, which in turn claims the benefit of Japanese Application No. 2019-174878, filed on Sep. 26, 2019, the entire disclosures of which Applications are incorporated by reference herein.

TECHNICAL FIELD

The present disclosure relates to a secondary battery and its manufacturing method.

BACKGROUND

In drive power sources of electric vehicles (EV) and hybrid electric vehicles (HEV, PHEV), secondary batteries such as alkaline secondary batteries and non-aqueous electrolyte secondary batteries are used.

In these secondary batteries, a battery housing is composed of a bottomed cylindrical outer body having an opening, and a sealing plate that seals the opening. An electrode assembly comprising a positive electrode plate, a negative electrode plate, and a separator is housed in the battery housing together with an electrolyte. The sealing plate has attached thereto a positive electrode terminal and a negative electrode terminal. The positive electrode terminal is electrically connected to the positive electrode plate via a positive electrode current collector, and the negative electrode terminal is electrically connected to the negative electrode plate via a negative electrode current collector.

As a secondary battery as described above, there has been proposed a secondary battery comprising an electrode group formed by winding a positive electrode and a negative electrode with a separator disposed between the two electrodes, wherein current collecting tabs are formed at both ends of the electrode group, and the current collecting tabs are welded to leads while in a state of being bent relative to the extending direction of the winding axis of the electrode group (Patent Literature 1 below).

CITATION LIST

Patent Literature

Patent Literature 1: JP 2014-14881 A

SUMMARY

Solution to Problem

A secondary battery according to one embodiment of the present disclosure includes: an electrode assembly including a positive electrode plate and a negative electrode plate; a rectangular outer body that has an opening and houses the electrode assembly; a sealing plate that seals the opening; and a terminal attached to the sealing plate, wherein the electrode assembly has a positive electrode tab group at one end and a negative electrode tab group at the other end; the rectangular outer body has a bottom portion, a pair of first side walls arranged to face each other, and a pair of second side walls arranged to face each other; one of the positive electrode tab group or the negative electrode tab group is electrically connected to the terminal by a first current collector and a second current collector; the first current collector includes a first section arranged between the sealing plate and the electrode assembly, and a second section which is bent from an end of the first section and arranged between one of the first side walls and the electrode assembly; the one of the positive electrode tab group or the negative electrode tab group is connected in a bent state to the second current collector; and the second current collector is welded to the second section.

According to the configuration of the secondary battery according to one embodiment of the present disclosure, the secondary battery is configured to have a higher volumetric energy density and a structure that is easy to assemble.

The secondary battery may be configured to include the electrode assembly in a plural number, and configured such that a plurality of second current collectors, each being said second current collector and being connected to the positive electrode tab group or the negative electrode tab group of a corresponding one of the electrode assemblies, are welded to the second section of the first current collector.

The secondary battery may be configured such that: the positive electrode tab group or the negative electrode tab group provided in one said electrode assembly is divided into a plurality of parts; a plurality of second current collectors, each being said second current collector, are provided, which are connected to the respective divided parts of the positive electrode tab group or the negative electrode tab group; and the plurality of second current collectors are welded to the second section of the first current collector.

The secondary battery may be configured such that: the second current collector includes a second section connection portion and a tab connection portion; the second section connection portion is welded to the second section; the one of the positive electrode tab group or the negative electrode tab group is connected to the tab connection portion; and the distance between the one of the first side walls and the tab connection portion is smaller than the distance between the one of the first side walls and the second section connection portion.

The secondary battery may be configured such that: a recess is provided in the second current collector; a through hole is provided inside the recess; and in the interior of the recess, the second current collector is welded to the second section.

The secondary battery may be configured such that: the second current collector has a plate-shaped section arranged along the one of the first side walls; and the one of the positive electrode tab group or the negative electrode tab group is connected to a surface of the plate-shaped section located toward the electrode assembly.

The secondary battery may be configured such that notches are provided at both ends, in the width direction, of the second section.

The secondary battery may be configured such that, in the second current collector, a fuse portion is provided between a welded portion in which the second current collector and the second section are welded together and a joint portion joining the second current collector and the one of the positive electrode tab group or the negative electrode tab group.

The secondary battery may be configured such that at least one of the positive electrode tab group and the negative electrode tab group is provided in the electrode assembly at a position off-centered toward the sealing plate.

In a secondary battery manufacturing method a according to one embodiment of the present disclosure, the secondary battery includes: an electrode assembly including a positive electrode plate and a negative electrode plate; a rectangular outer body that has an opening and houses the electrode assembly; a sealing plate that seals the opening; and a terminal attached to the sealing plate, wherein the electrode assembly has a positive electrode tab group at one end and a negative electrode tab group at the other end; the rectangular outer body has a bottom portion, a pair of first side walls arranged to face each other, and a pair of second side walls arranged to face each other; and one of the positive electrode tab group or the negative electrode tab group is electrically connected to the terminal by a first current collector and a second current collector. The method includes the steps of: attaching the first current collector to the sealing plate; connecting the positive electrode tab group or the negative electrode tab to the second current collector; bending the one of the positive electrode tab group or the negative electrode tab group and changing the orientation of the second current collector connected to the one of the positive electrode tab group or the negative electrode tab group; and welding the second current collector having the one of the positive electrode tab group or the negative electrode tab group connected thereto to the first current collector attached to the sealing plate.

According to the secondary battery manufacturing method according to one embodiment of the present disclosure, the secondary battery having a higher volumetric energy density can be easily manufactured.

The first current collector may include a first section to be arranged between the sealing plate and the electrode assembly, and a second section which is bent from an end of the first section and is to be arranged between one of the first side walls and the electrode assembly, and the second current collector having the one of the positive electrode tab group or the negative electrode tab group connected thereto may be welded to the second section.

A recess may be provided in the second current collector, a through hole may be provided inside the recess, and the second current collector may be welded to the second section by irradiating a high-energy beam to the interior of the recess.

Notches may be provided at both ends, in the width direction, of the second section, and the second current collector may be welded to the second section while the notches are gripped.

It may be such that: the terminal is a negative electrode terminal; the first current collector is a first negative electrode current collector; the first section is a negative electrode first section; the second section is a negative electrode second section; the second current collector is a second negative electrode current collector; the secondary battery further includes a first positive electrode current collector and a second positive electrode current collector; the first positive electrode current collector includes a positive electrode first section arranged between the sealing plate and the electrode assembly, and a positive electrode second section arranged between the other one of the first side walls and the electrode assembly. The method further includes the steps of: attaching the first positive electrode current collector to the sealing plate; connecting the positive electrode tab group to the second positive electrode current collector; bending the positive electrode tab group and changing the orientation of the second positive electrode current collector connected to the positive electrode tab group; arranging such that the positive electrode second section of the first positive electrode current collector attached to the sealing plate and the negative electrode second section of the first negative electrode current collector attached to the sealing plate are located between the second positive electrode current collector having the positive electrode tab group connected thereto and the second negative electrode current collector having the negative electrode tab group connected thereto; reducing the distance between the second positive electrode current collector and the second negative electrode current collector; and welding together the positive electrode second section and the second positive electrode current collector, and welding together the negative electrode second section and the second negative electrode current collector.

According to the present disclosure, a secondary battery having a higher volumetric energy density can be provided.

DESCRIPTION OF EMBODIMENTS

A configuration of a secondary battery 20 according to an embodiment will now be described. The present disclosure is not limited to embodiments described below.

Figure 1:
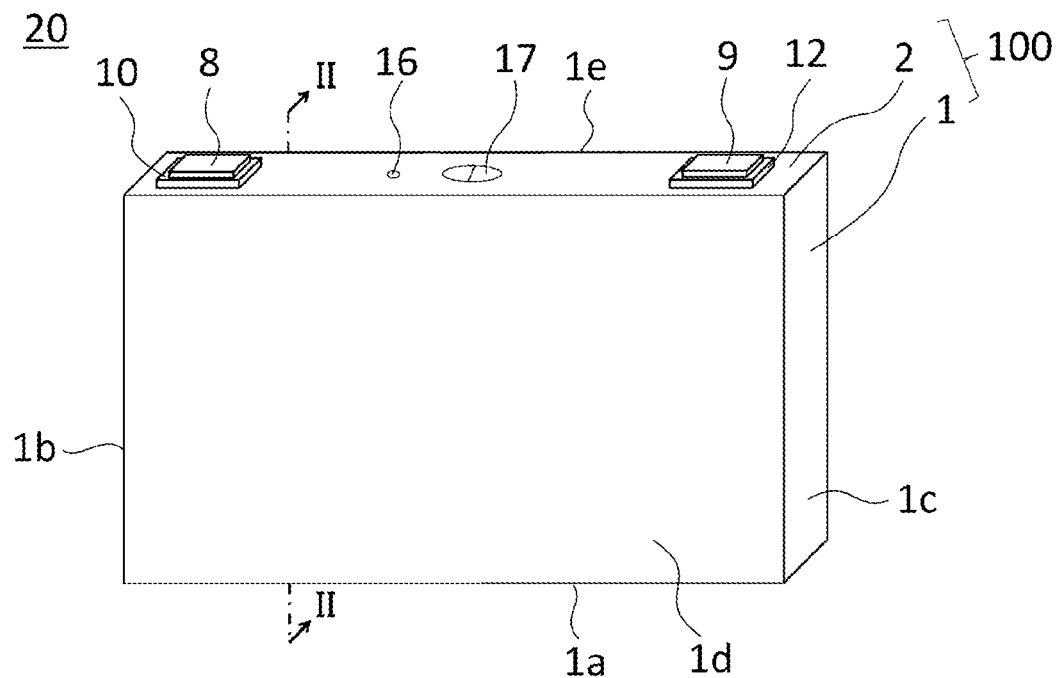
FIG. 1 is a perspective view of a secondary battery according to an embodiment.
Figure 2:
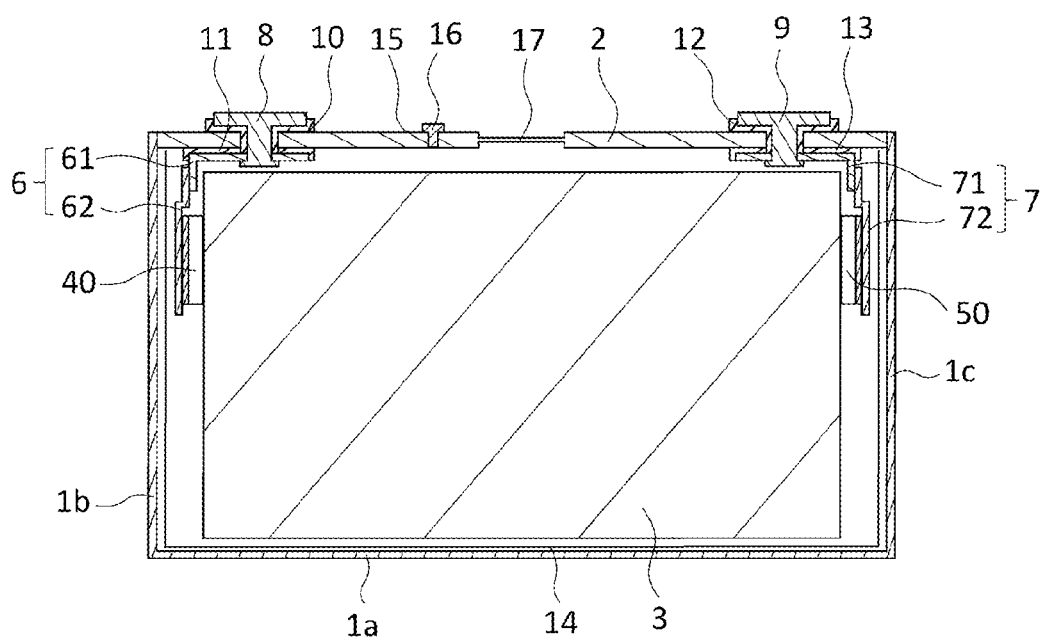
FIG. 2 is a cross-sectional view of the secondary battery taken along line II-II in FIG. 1.

As shown in FIGS. 1 and 2, the secondary battery 20 comprises a battery housing 100 composed of a rectangular outer body 1 having an opening and a bottomed rectangular tube shape, and a sealing plate 2 that seals the opening of the rectangular outer body 1. The rectangular outer body 1 has a bottom portion 1a, a pair of first side walls 1b and 1c, and a pair of second side walls 1d and 1e. The pair of first side walls 1b, 1c are arranged to face each other, and the pair of second side walls 1d, 1e are arranged to face each other. The area of the pair of first side walls 1b, 1c is smaller than the area of the pair of second side walls 1d, 1e. The rectangular outer body 1 and the sealing plate 2 are respectively preferably made of metal, and more preferably made of aluminum or iron. Inside the rectangular outer body 1, an electrode assembly 3 including a positive electrode plate 4 and a negative electrode plate 5 is housed together with an electrolyte. The electrode assembly 3 according to the embodiment is a flat-shaped spiral electrode assembly formed by winding the strip-shaped positive electrode plate 4 and the strip-shaped negative electrode plate 5 with a strip-shaped separator disposed between the two electrode plates 4, 5. In the electrode assembly 3, a positive electrode tab group 40 is provided at one end in the extending direction of the winding axis, and a negative electrode tab group 50 is provided at the other end in the extending direction of the winding axis.

The sealing plate 2 has attached thereto a positive electrode terminal 8 and a negative electrode terminal 9. The positive electrode tab group 40 is electrically connected to the positive electrode terminal 8 via a positive electrode current collector 6. The positive electrode current collector 6 includes a first positive electrode current collector 61 and a second positive electrode current collector 62. The negative electrode tab group 50 is electrically connected to the negative electrode terminal 9 via a negative electrode current collector 7. The negative electrode current collector 7 includes a first negative electrode current collector 71 and a second negative electrode current collector 72.

The positive electrode tab group 40 includes a plurality of positive electrode tabs 4b. The second positive electrode current collector 62 has a section arranged along the first side wall 1b of the rectangular outer body 1. The positive electrode tab group 40 is connected, in a bent state, to the section of the second positive electrode current collector 62 arranged along the first side wall 1b. The second positive electrode current collector 62 has a plate-shaped section arranged along the first side wall 1b of the rectangular outer body 1, and the positive electrode tab group 40 is connected to a surface of the plate-shaped section located toward the electrode assembly 3. The tilt of the plate-shaped section with respect to the first side wall 1b is preferably smaller than ±30°, more preferably smaller than ±15°, and even more preferably smaller than ±10°. It is more preferable that the plate-shaped section is substantially parallel to the first side wall 1b (e.g., the tilt of the plate-shaped section with respect to the first side wall 1b is within ±5°).

The negative electrode tab group 50 includes a plurality of negative electrode tabs 5b. The second negative electrode current collector 72 has a section arranged along the first side wall 1c of the rectangular outer body 1. The negative electrode tab group 50 is connected, in a bent state, to the section of the second negative electrode current collector 72 arranged along the first side wall 1c. The second negative electrode current collector 72 has a plate-shaped section arranged along the first side wall 1c of the rectangular outer body 1, and the negative electrode tab group 50 is connected to a surface of the plate-shaped section located toward the electrode assembly 3. The tilt of the plate-shaped section with respect to the first side wall 1c is preferably smaller than ±30°, more preferably smaller than ±15°, and even more preferably smaller than ±10°. It is more preferable that the plate-shaped section is substantially parallel to the first side wall 1c (e.g., the tilt of the plate-shaped section with respect to the first side wall 1c is within ±5°).

An outer side insulating member 10 made of resin is arranged between the sealing plate 2 and the positive electrode terminal 8. An inner side insulating member 11 made of resin is arranged between the sealing plate 2 and the first positive electrode current collector 61. An outer side insulating member 12 made of resin is arranged between the sealing plate 2 and the negative electrode terminal 9. An inner side insulating member 13 made of resin is arranged between the sealing plate 2 and the first negative electrode current collector 71.

The electrode assembly 3 is placed inside an electrode assembly holder 14 formed by folding an insulating sheet made of resin into a box shape or a bag shape.

The sealing plate 2 has an electrolyte solution injection hole 15 formed therein, and the electrolyte solution injection hole 15 is sealed by a sealing member 16. In the sealing plate 2, a gas discharge valve 17 is provided, which ruptures and discharges gas inside the battery housing 100 when the pressure inside the battery housing 100 exceeds a predetermined value.

Next, a method for manufacturing the secondary battery 20 and details of the respective structures will be described.

[Attachment of Terminals and First Current Collectors to Sealing Plate]

The sealing plate 2 has a positive electrode terminal mounting hole near one end and a negative electrode terminal mounting hole near the other end. The outer side insulating member 10 is arranged on the outer surface side of an area around the positive electrode terminal mounting hole of the sealing plate 2, and the inner side insulating member 11 and the first positive electrode current collector 61 are arranged on the inner surface side of the area around the positive electrode terminal mounting hole of the sealing plate 2. Subsequently, the positive electrode terminal 8 is inserted from the battery outer side into a through hole of the outer side insulating member 10, the positive electrode terminal mounting hole of the sealing plate 2, a through hole of the inner side insulating member 11, and a through hole of the first positive electrode current collector 61. The positive electrode terminal 8 is then crimped to the first positive electrode current collector 61. It is more preferable to further weld the crimped part of the positive electrode terminal 8 to the first positive electrode current collector 61.

The outer side insulating member 12 is arranged on the outer surface side of an area around the negative electrode terminal mounting hole of the sealing plate 2, and the inner side insulating member 13 and the first negative electrode current collector 71 are arranged on the inner surface side of the area around the negative electrode terminal mounting hole of the sealing plate 2. Subsequently, the negative electrode terminal 9 is inserted from the battery outer side into a through hole of the outer side insulating member 12, the negative electrode terminal mounting hole of the sealing plate 2, a through hole of the inner side insulating member 13, and a through hole of the first negative electrode current collector 71. The negative electrode terminal 9 is then crimped to the first negative electrode current collector 71. It is more preferable to further weld the crimped part of the negative electrode terminal 9 to the first negative electrode current collector 71.

Figure 3A:
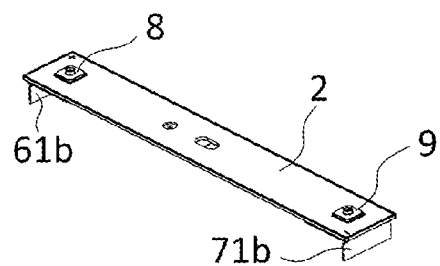
FIG. 3A is a diagram showing a battery outer surface side of a sealing plate having attached thereto a positive electrode terminal, a negative electrode terminal, a first positive electrode current collector, and a first negative electrode current collector.
Figure 3B:
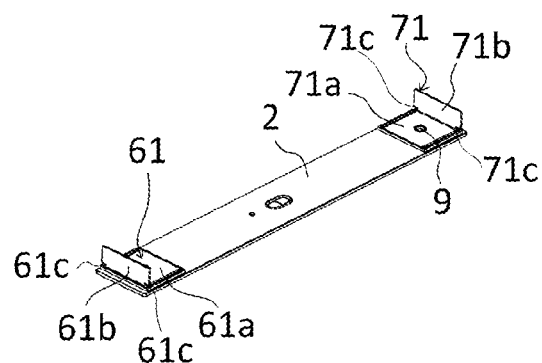
FIG. 3B is a diagram showing a battery inner surface side of the sealing plate having attached thereto the positive electrode terminal, the negative electrode terminal, the first positive electrode current collector, and the first negative electrode current collector.

FIGS. 3A and 3B are perspective views of the sealing plate 2 having attached thereto the positive electrode terminal 8, the first positive electrode current collector 61, the negative electrode terminal 9, and the first negative electrode current collector 71. FIG. 3A shows the battery outer side, and FIG. 3B shows the battery inner side.

The first positive electrode current collector 61 has a first section 61a arranged along the sealing plate 2 and a second section 61b bent from an end portion of the first section 61a. When assembled in the secondary battery 20, the first section 61a is arranged between the sealing plate 2 and the electrode assembly 3. The second section 61b extends from the first section 61a toward the bottom portion 1a of the rectangular outer body 1. The second section 61b is arranged between the first side wall 1b of the rectangular outer body 1 and the electrode assembly 3.

The first negative electrode current collector 71 has a first section 71a arranged along the sealing plate 2 and a second section 71b bent from an end portion of the first section 71a. When assembled in the secondary battery 20, the first section 71a is arranged between the sealing plate 2 and the electrode assembly 3. The second section 71b extends from the first section 71a toward the bottom portion 1a of the rectangular outer body 1. The second section 71b is arranged between the first side wall 1c of the rectangular outer body 1 and the electrode assembly 3.

In the second section 61b of the first positive electrode current collector 61, it is preferable to provide notches 61c at both ends in the width direction. By gripping the notches 61c when connecting the second positive electrode current collector 62 described further below to the second section 61b, more stable welding can be performed, and a joint having a higher quality can be formed stably. The notches 61c are preferably provided in the second section 61b in an area toward the bottom portion 1a of the rectangular outer body 1 from the inner side insulating member 11. The notches 61c are preferably provided in the second section 61b near its end portion toward the first section 61a. The second section 71b of the first negative electrode current collector 71 also preferably has notches 71c formed therein at both ends in the width direction. When the inner side insulating member 11 has a wall portion covering a part of the second section 61b, the notches 61c preferably have an area not covered by the wall portion of the inner side insulating member 11.

The positive electrode terminal 8 and the first positive electrode current collector 61 are preferably made of metal, and more preferably made of aluminum. The negative electrode terminal 9 and the first negative electrode current collector 71 are preferably made of metal, and more preferably made of copper. The negative electrode terminal 9 can be configured to include a section made of aluminum and a section made of copper. In that case, it is preferable to connect the section made of copper to the first negative electrode current collector 71 made of copper, and to expose the section made of aluminum to the battery outer side.

[Positive Electrode Plate]

First, a method for manufacturing a positive electrode plate will be described.

[Preparation of Positive Electrode Active Material Layer Slurry]

A positive electrode active material layer slurry is prepared by kneading lithium-nickel-cobalt-manganese composite oxide that serves as a positive electrode active material, polyvinylidene fluoride (PVdF) that serves as a binder, a carbon material that serves as a conductive material, and N-methyl-2-pyrrolidone (NMP) that serves as a dispersion medium, so that the mass ratio of lithium-nickel-cobalt-manganese composite oxide:PVdF:carbon material becomes 97.5:1:1.5.

[Preparation of Positive Electrode Protective Layer Slurry]

A protective layer slurry is prepared by kneading alumina powder, a carbon material that serves as a conductive material, polyvinylidene fluoride (PVdF) that serves as a binder, and N-methyl-2-pyrrolidone (NMP) that serves as a dispersion medium, so that the mass ratio of alumina powder:carbon material:PVdF becomes 83:3:14.

[Formation of Positive Electrode Active Material Layer and Positive Electrode Protective Layer]

Onto both sides of an aluminum foil that serves as a positive electrode core, the positive electrode active material layer slurry and the positive electrode protective layer slurry prepared by the above-described methods are applied using a die coater. At that time, the positive electrode active material layer slurry is applied to the center, in the width direction, of the positive electrode core. Further, the positive electrode protective layer slurry is applied to end portions, in the width direction, of the areas to which the positive electrode active material layer slurry is applied.

The positive electrode core coated with the positive electrode active material layer slurry and the positive electrode protective layer slurry is dried to remove NMP contained in the positive electrode active material layer slurry and the positive electrode protective layer slurry. As a result, a positive electrode active material layer and a positive electrode protective layer are formed. Subsequently, the positive electrode active material layer is compressed to obtain a positive electrode original plate. This positive electrode original plate is cut into a predetermined shape to obtain a positive electrode plate 4. The cutting of the positive electrode original plate can be performed by irradiating an energy beam such as a laser or by using a metal punch die or a cutter.

Figure 4:
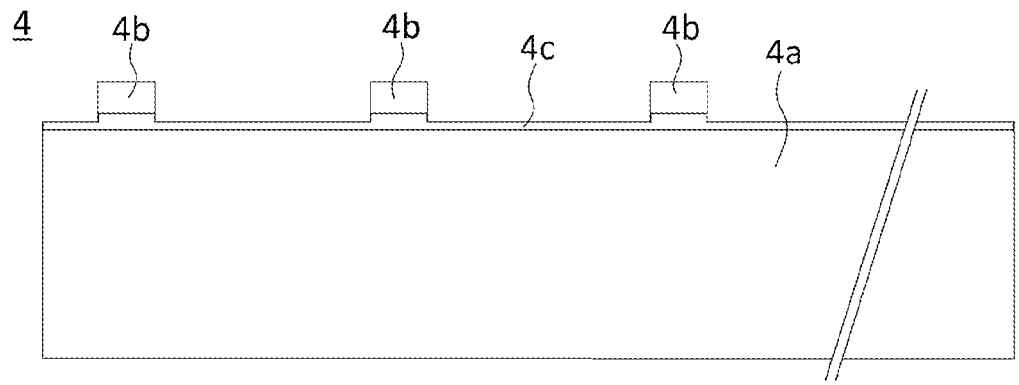
FIG. 4 is a plan view of a positive electrode plate according to the embodiment.

FIG. 4 is a plan view of the positive electrode plate 4. The positive electrode plate 4 has, on both sides of the positive electrode core, an area in which a positive electrode active material layer 4a is formed. A plurality of positive electrode tabs 4b are provided at one end of the positive electrode plate 4 in the width direction. Each positive electrode tab 4b is composed of an exposed portion of the positive electrode core. At the base portion of the positive electrode tabs 4b, a positive electrode protective layer 4c having a lower conductivity than the positive electrode active material layer 4a is provided. The positive electrode protective layer 4c may be an insulating layer made of resin, a layer containing a ceramic and a resin binder, or the like. Further, the positive electrode protective layer 4c may contain a conductive material such as a carbon material. It is also possible that the positive electrode protective layer 4c is not provided.

[Negative Electrode Plate]

Next, a method for manufacturing a negative electrode plate will be described.

[Preparation of Negative Electrode Active Material Layer Slurry]

A negative electrode active material layer slurry is prepared by kneading graphite that serves as a negative electrode active material, styrene-butadiene rubber (SBR) and carboxymethyl cellulose (CMC) that serve as a binder, and water that serves as a dispersion medium, so that the mass ratio of graphite:SBR:CMC becomes 98:1:1.

[Formation of Negative Electrode Active Material Layer]

Onto both sides of a copper foil that has a thickness of 8 μm and serves as a negative electrode core, the negative electrode active material layer slurry prepared by the above-described method is applied using a die coater.

The negative electrode core coated with the negative electrode active material layer slurry is dried to remove water contained in the negative electrode active material layer slurry. As a result, a negative electrode active material layer is formed. Subsequently, the negative electrode active material layer is compressed to obtain a negative electrode original plate. This negative electrode original plate is cut into a predetermined shape to obtain a negative electrode plate 5. The cutting of the negative electrode original plate can be performed by irradiating an energy beam such as a laser or by using a metal punch die or a cutter.

Figure 5:
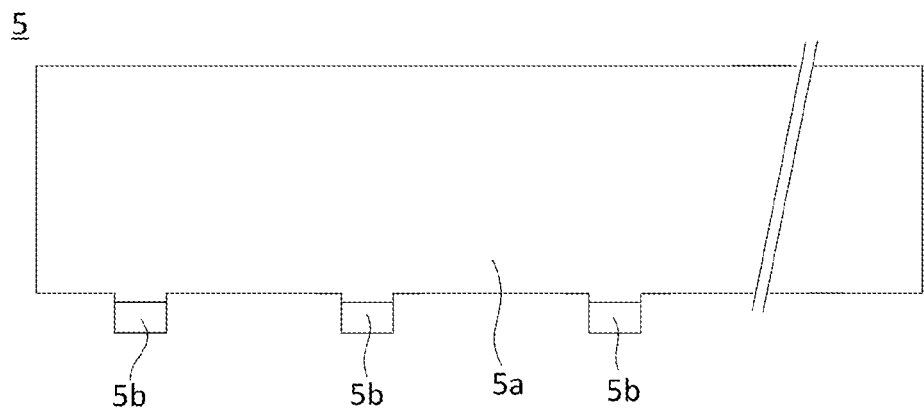
FIG. 5 is a plan view of a negative electrode plate according to the embodiment.

FIG. 5 is a plan view of the negative electrode plate 5. The negative electrode plate 5 has, on both sides of the negative electrode core, an area in which the negative electrode active material layer 5a is formed. A plurality of negative electrode tabs 5b are provided at one end of the negative electrode plate 5 in the width direction. Each negative electrode tab 5b is composed of an exposed portion of the negative electrode core.

[Preparation of Electrode Assembly]

A flat-shaped spiral electrode assembly 3 is produced by winding the strip-shaped positive electrode plate 4 and the strip-shaped negative electrode plate 5 produced by the above-described methods, with a polyolefin strip-shaped separator disposed between the two electrode plates 4, 5. The electrode assembly 3 has a flat-shaped section at the center and curved portions at both ends of the flat-shaped section. One outer surface of the flat-shaped section is a first main surface 3a, and the other outer surface of the flat-shaped section is a second main surface 3b.

Figure 6:
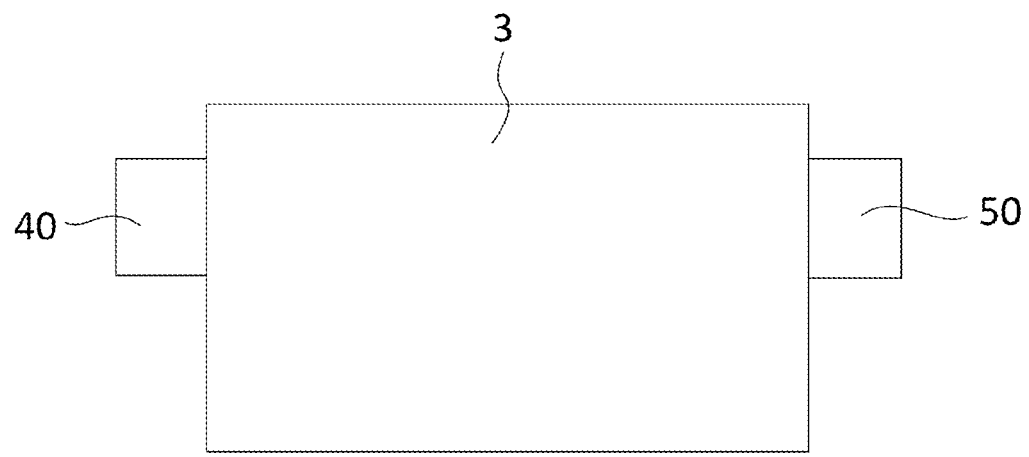
FIG. 6 is a plan view of an electrode assembly according to the embodiment.

FIG. 6 is a plan view of the electrode assembly 3. At one end of the electrode assembly 3 in the extending direction of the winding axis, a positive electrode tab group 40 is provided, in which a plurality of positive electrode tabs 4b are laminated. At the other end of the electrode assembly 3 in the extending direction of the winding axis, a negative electrode tab group 50 is provided, in which a plurality of negative electrode tabs 5b are laminated. The center of the positive electrode tab group 40 and the center of the negative electrode tab group 50 are arranged so as to be shifted from the winding axis to one side (upper side in FIG. 6) along a direction (the vertical direction in FIG. 6) that is orthogonal to the extending direction of the winding axis of the electrode assembly 3 and also orthogonal to the thickness direction of the electrode assembly 3.

The shape of the positive electrode tabs 4b and/or the negative electrode tabs 5b in plan view may be such that the width gradually increases from the tip toward the base. With this configuration, the secondary battery 20 is such that, even when an impact or vibration is applied to the secondary battery 20, the positive electrode tabs 4b and/or the negative electrode tabs 5b are not easily damaged. Further, it is more effective to form the corner portions of the base portion to have a rounded shape. By providing the positive electrode protective layer 4c at the base portion of the positive electrode tabs 4b as described above, damages to the positive electrode tabs 4b can be suppressed. Further, by providing the negative electrode active material layer 5a at the base portion of the negative electrode tabs 5b, damages to the negative electrode tabs 5b can be suppressed.

[Second Positive Electrode Current Collector and Second Negative Electrode Current Collector]

Figure 7A:
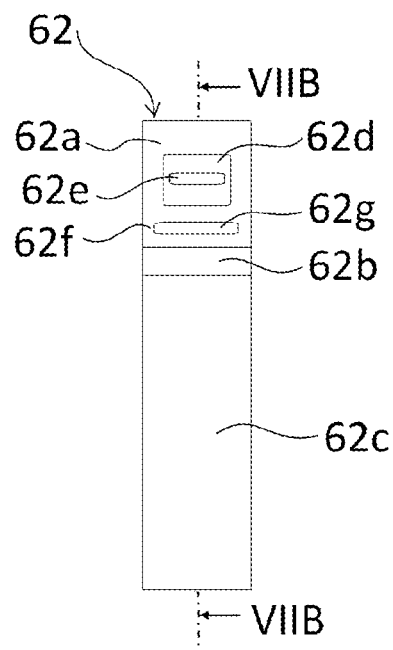
FIG. 7A is a plan view of a second positive electrode current collector according to the embodiment.
Figure 7B:
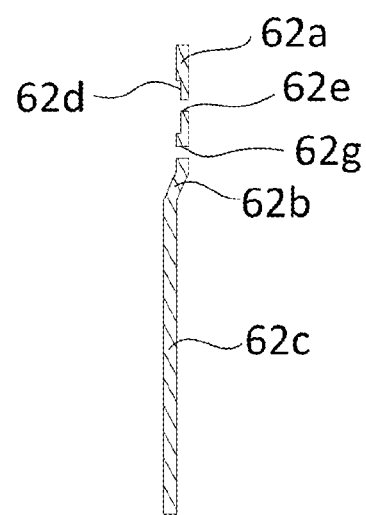
FIG. 7B is a cross-sectional view of the second positive electrode current collector taken along line VIIB-VIIB in FIG. 7A.

FIG. 7A is a plan view of the second positive electrode current collector 62. FIG. 7B is a cross-sectional view taken along line VIIB-VIIB in FIG. 7A. The second positive electrode current collector 62 has a second section connection portion 62a, a sloped portion 62b, and a tab connection portion 62c. The second section connection portion 62a is connected to the second section 61b of the first positive electrode current collector 61. To the tab connection portion 62c, the positive electrode tab group 40 is connected. The sloped portion 62b is arranged so as to be sloped with respect to each of the second section connection portion 62a and the tab connection portion 62c, and connects between the second section connection portion 62a and the tab connection portion 62c. By means of the sloped portion 62b, a difference in level is provided between the second section connection portion 62a and the tab connection portion 62c. The angle of the sloped portion 62b relative to the second section connection portion 62a and the angle of the sloped portion 62b relative to the tab connection portion 62c are not particularly limited. The shape of the second positive electrode current collector 62 is not limited. It is possible to form the second positive electrode current collector 62 in a flat plate shape.

The second section connection portion 62a has a recess 62d formed therein. The portion where the recess 62d is provided is thinner than its periphery. A through hole 62e is provided inside the recess 62d. In the interior of the recess 62d, the second section 61b and the second section connection portion 62a are joined.

A fuse portion 62f is provided in the second section connection portion 62a. The fuse portion 62f is a part that melts and disconnects when an excessive current flows in the secondary battery 20. The fuse portion 62f is a part of the second section connection portion 62a in which the cross-sectional area is reduced by forming a fuse hole 62g. The fuse portion 62f is preferably provided in the second positive electrode current collector 62 between a position where the second section 61b is bonded and a position where the positive electrode tab group 40 is bonded. The fuse portion 62f is sufficient so long as it is a part having a small cross-sectional area, and may be a part in which a notch or a thin-walled portion is provided.

The shape of the second negative electrode current collector 72 can be the same as the shape of the second positive electrode current collector 62. The second positive electrode current collector 62 is preferably made of metal, and more preferably made of aluminum. The second negative electrode current collector 72 is preferably made of metal, and more preferably made of copper, nickel, or iron.

It is possible that the fuse portion 62f is not provided in the second positive electrode current collector 62. Further, it is possible that a fuse portion is not provided in the second negative electrode current collector 72.

[Connection Between First Current Collector and Tab Group]

Figure 8:
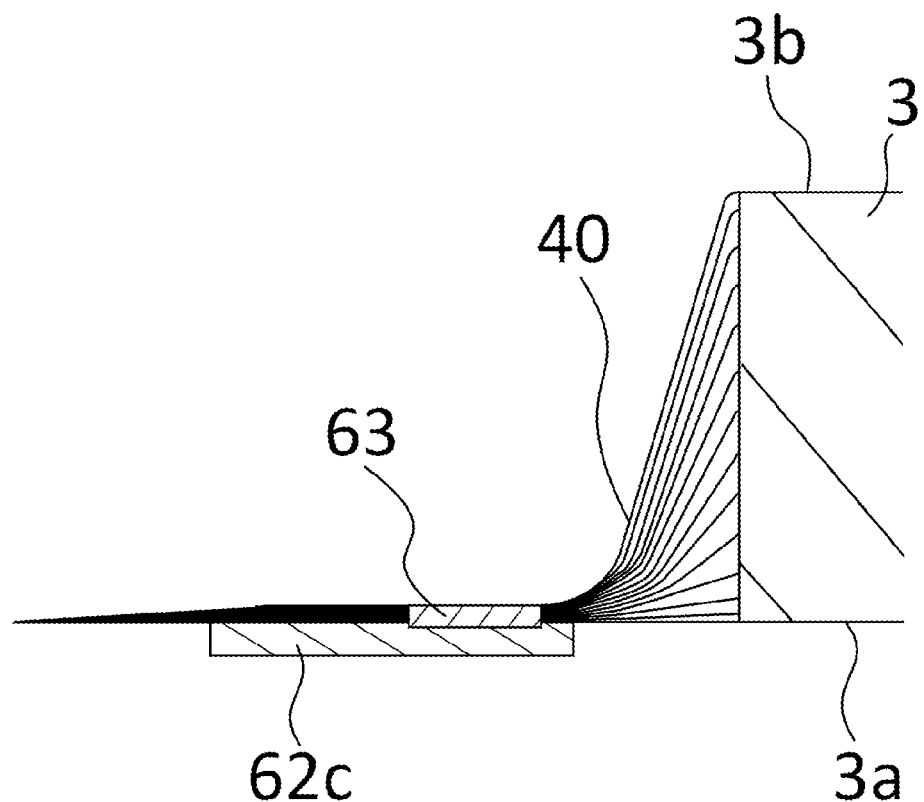
FIG. 8 is a cross-sectional view showing a state in which a positive electrode tab group is connected to the second positive electrode current collector.

As shown in FIG. 8, the positive electrode tab group 40 is placed on the tab connection portion 62c of the second positive electrode current collector 62, and the tab connection portion 62c and the positive electrode tab group 40 are bonded to form a joint portion 63. For the bonding, it is possible to use ultrasonic welding (ultrasonic bonding), resistance welding, welding by irradiation of a high-energy beam such as a laser, or the like. The tab connection portion 72c of the second negative electrode current collector 72 and the negative electrode tab group 50 can also be bonded in the same manner.

On the tab connection portion 62c of the second positive electrode current collector 62, the joint portion 63 is arranged so as to be off-centered toward the base portion of the positive electrode tab group 40 (i.e., toward the right in FIG. 8) along the width direction of the tab connection portion 62c (i.e., the horizontal direction in FIG. 8). With this configuration, when the positive electrode tab group 40 is bent, it is more reliably possible to stably form a curved shape in the vicinity of the base portion of the positive electrode tab group 40. As a result, damages to the positive electrode tab group 40 can be suppressed. Further, even when the positive electrode tabs 4b are misaligned, the positive electrode tab group 40 and the tab connection portion 62c can be joined stably.

As shown in FIG. 8, it is preferably to bond together the positive electrode tab group 40 and the tab connection portion 62c with the tip of the positive electrode tab group 40 protruding outward (i.e., toward the left in FIG. 8) from the tab connection portion 62c of the second positive electrode current collector 62. As a result, the positive electrode tab group 40 and the tab connection portion 62c can be joined more stably.

Figure 9:
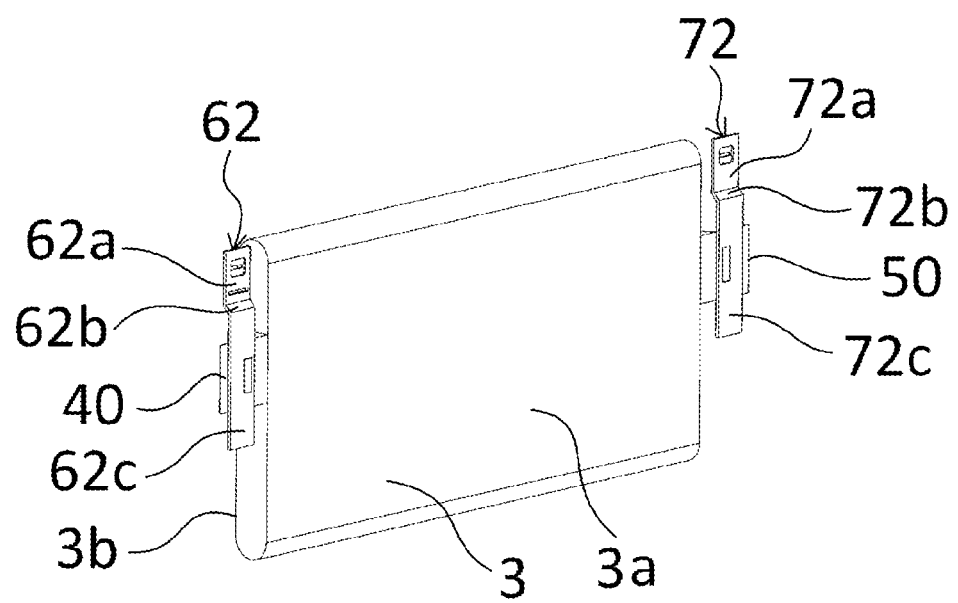
FIG. 9 is a perspective view of an electrode assembly to which the second positive electrode current collector and a second negative electrode current collector are attached.

FIG. 9 is a perspective view of the electrode assembly 3 to which the second positive electrode current collector 62 and the second negative electrode current collector 72 are attached. The lower end of the second positive electrode current collector 62 (i.e., the end portion located toward the bottom portion 1a of the rectangular outer body 1) is preferably located below the lower end of the positive electrode tab group 40 (i.e., the end portion located toward the bottom portion 1a of the rectangular outer body 1). With this configuration, in the below-described step of bending the positive electrode tab group 40, the positive electrode tab group 40 can be bent more reliably and stably. The above description also applies to the second negative electrode current collector 72 and the negative electrode tab group 50.

[Bending of Tab Group]

Figure 10:
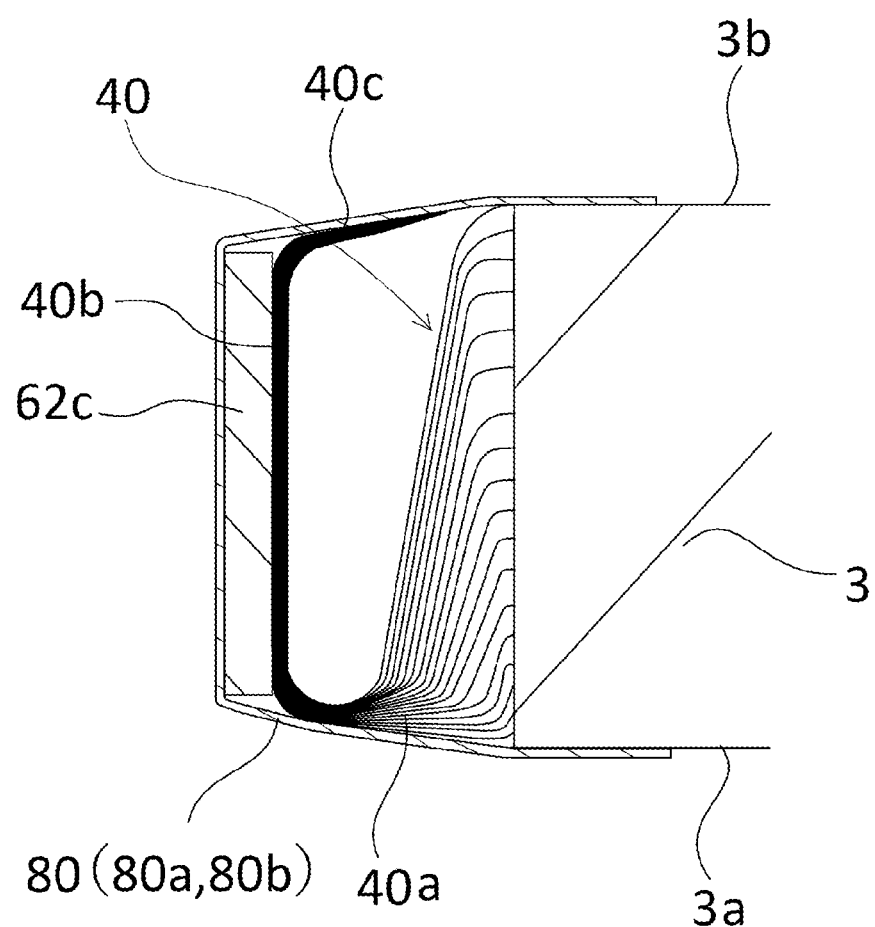
FIG. 10 is a cross-sectional view of the vicinity of the connecting portion between the second positive electrode current collector and the positive electrode tab group, and is a diagram showing a state in which the positive electrode tab group is bent and fixed.

The positive electrode tab group 40 is to be placed in a bent state as shown in FIG. 10. By bending the positive electrode tab group 40, the tab connection portion 62c of the second positive electrode current collector 62, which has been arranged substantially parallel to the first main surface 3a and the second main surface 3b of the electrode assembly 3 as shown in FIG. 9, is placed in an orientation substantially orthogonal to the winding axis of the electrode assembly 3 (for example, the tilt of the tab connection portion 62c relative to the winding axis is smaller than ±15°). Then, a tape 80 that serves as a fixing means is attached to extend from the first main surface 3a of the electrode assembly 3, over the tab connection portion 62c, and to the second main surface 3b of the electrode assembly 3. With this configuration, the positive electrode tab group 40 can more stably be maintained in a curved state. Further, the curved positive electrode tab group 40 can be configured to have elasticity such that, when the second positive electrode current collector 62 is pressed toward the electrode assembly 3, the second positive electrode current collector 62 can move in a direction approaching the electrode assembly 3. When bending the positive electrode tab group 40, the second positive electrode current collector 62 itself is not bent.

As shown in FIG. 10, the positive electrode tab group 40 has a contact section 40b that abuts on the tab connection portion 62c, a base section 40a located toward the base portion of the positive electrode tab group 40 from the contact section 40b, and a tip section 40c located toward the tip of the positive electrode tab group 40 from the contact section 40b. By having the tip section 40c fixed with the tape 80 in a state of being bent from the contact section 40b, ease of assembly in subsequent steps is enhanced. By providing the tip section 40c, the contact section 40b can be provided in a large area, and when bonding together the positive electrode tab group 40 and the tab connection portion 62c, the bonding can be performed more stably. It is also possible that the tip section 40c is not provided.

The negative electrode tab group 50 is also fixed in a bent state in the same manner as the positive electrode tab group 40.

[Electrode Assembly Group]

Figure 11:
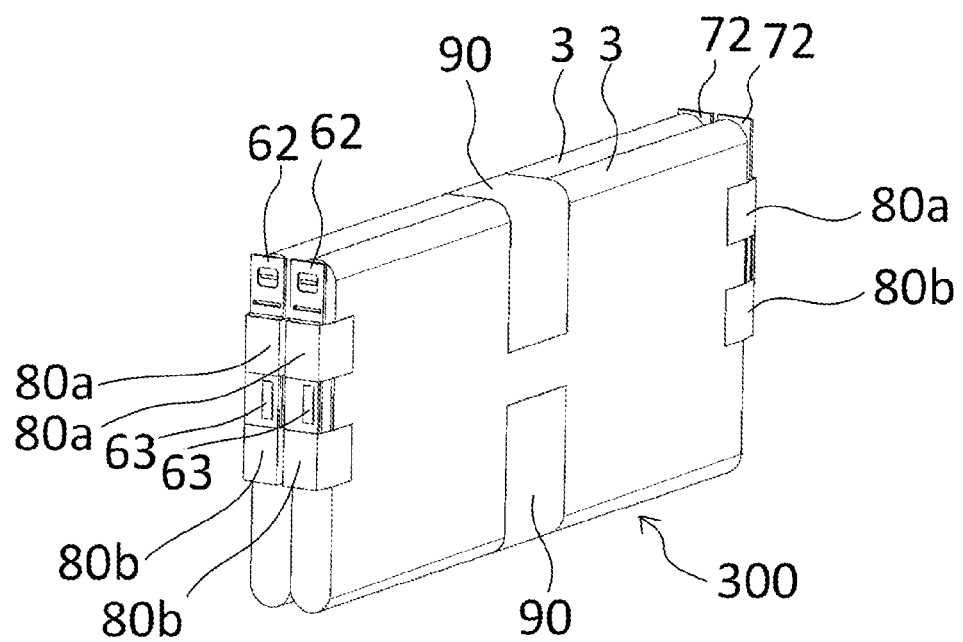
FIG. 11 is a perspective view of an electrode assembly group including a plurality of electrode assemblies.

A plurality of electrode assemblies 3, each having the positive electrode tab group 40 and the negative electrode tab group 50 respectively in a bent state, are laminated and fixed together using an electrode assembly fixing means 90 such as a tape to thereby form an electrode assembly group 300. FIG. 11 is a perspective view of the electrode assembly group 300. The respective positive electrode tab groups 40 are arranged on one same side, and the respective negative electrode tab groups 50 are arranged on one same side. Further, in the respective electrode assemblies 3, the positive electrode tab groups 40 are bent in one same direction. In the respective electrode assemblies 3, the negative electrode tab groups 50 are bent in one same direction. The electrode assembly group 300 according to the embodiment includes two electrode assemblies 3. The number of electrode assemblies 3 included in the electrode assembly group 300 is not limited to two.

A first tape 80a and a second tape 80b are preferably included as the tape 80 that serves as the fixing means attached to extend from the first main surface 3a of the electrode assembly 3, over the tab connection portion 62c, and to the second main surface 3b of the electrode assembly 3. As shown in FIG. 11, on the tab connection portion 62c of the second positive electrode current collector 62, it is preferable to attach the first tape 80a above the joint portion 63 joining the tab connection portion 62c and the positive electrode tab group 40, and to attach the second tape 80b below the joint portion 63 joining the tab connection portion 62c and the positive electrode tab group 40. With this configuration, the curved state of the positive electrode tab group 40 can be maintained stably. The above description also applies to the tab connection portion 72c of the second negative electrode current collector 72.

As shown in FIG. 11, it is preferable that the upper end of the first tape 80a arranged on the upper side is located above the upper end of the positive electrode tab group 40, and the lower end of the second tape 80b arranged on the lower side is located below the lower end of the positive electrode tab group 40. With this configuration, the curved shape of the positive electrode tab group 40 can be maintained more reliably.

As shown in FIG. 11, in the laminating direction of the electrode assemblies 3, the second positive electrode current collectors 62 attached to the respective electrode assemblies 3 are arranged with an interval and connected to the second section 61b of the first positive electrode current collector 61. This description also applies to the respective second negative electrode current collectors 72.

In each electrode assembly 3 according to the embodiment, the joint portion 63 joining the positive electrode tab group 40 and the tab connection portion 62c is arranged between the lower end of the first tape 80a and the upper end of the second tape 80b.

In the embodiment, although the tape is divided into two upper and lower tapes, namely, the first tape 80a and the second tape 80b, it is also possible to use a single tape. In that case, it is preferable that the upper end of the single tape is located above the upper end of the positive electrode tab group 40 and the lower end of the single tape is located below the lower end of the positive electrode tab group 40. The tape 80 may be arranged to cover the part of the tab connection portion 62c where the joint portion 63 is formed. The same configuration can be employed also on the side of the second negative electrode current collector 72 and the negative electrode tab group 50.

[Connection Between First Current Collector and Second Current Collector]

The second section 61b of the first positive electrode current collector 61 is arranged on the inner side of the second section connection portion 62a of the second positive electrode current collector 62, and the second section 71b of the first negative electrode current collector 71 is arranged on the inner side of the second section connection portion 72a of the second negative electrode current collector 72. Then, the second section 61b of the first positive electrode current collector 61 and the second section connection portion 62a of the second positive electrode current collector 62 are bonded. Further, the second section 71b of the first negative electrode current collector 71 is bonded to the second section connection portion 72a of the second negative electrode current collector 72. As the bonding method, it is possible to use ultrasonic welding (ultrasonic bonding), resistance welding, welding by irradiation of a high-energy beam such as a laser, or the like. In particular, it is preferable to use welding by irradiation of a high-energy beam such as a laser.

Figure 12A:
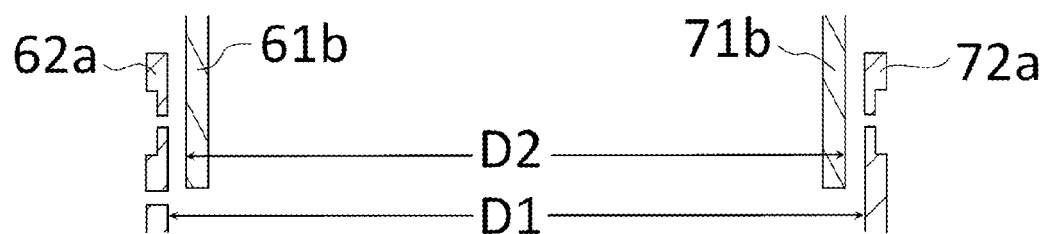
FIG. 12A is a diagram showing a state in which a first positive electrode current collector and a first negative electrode current collector are arranged between a second positive electrode current collector and a second negative electrode current collector.
Figure 12B:
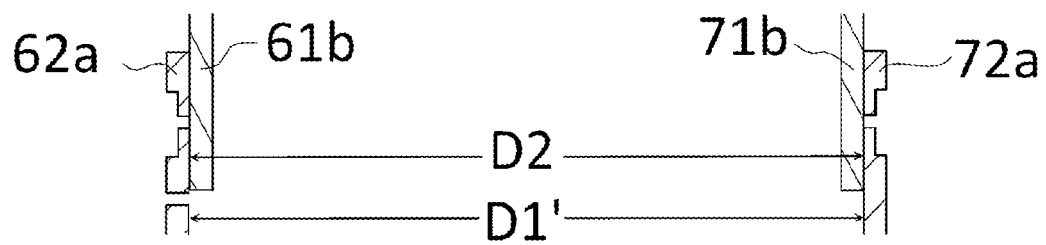
FIG. 12B is a diagram showing a state in which the distance between the second positive electrode current collector and the second negative electrode current collector is reduced.
Figure 12C:
FIG. 12C is a diagram showing a state after connecting the first positive electrode current collector to the second positive electrode current collector and connecting the first negative electrode current collector to the second negative electrode current collector.

FIGS. 12A to 12C are cross-sectional views taken along the winding axis of the electrode assembly 3, showing the second section 61b of the first positive electrode current collector 61, the second section 71b of the first negative electrode current collector 71, the second section connection portion 62a of the second positive electrode current collector 62, and the second section connection portion 72a of the second negative electrode current collector 72 in respective stages.

As shown in FIG. 12A, the second section 61b of the first positive electrode current collector 61 and the second section 71b of the first negative electrode current collector 71 are placed between the second section connection portion 62a of the second positive electrode current collector 62 and the second section connection portion 72a of the second negative electrode current collector 72. At that time, the distance D1 between the inner surface of the second section connection portion 62a and the inner surface of the second section connection portion 72a is preferably larger than the distance D2 between the outer surface of the second section 61b and the outer surface of the second section 71b. D1 is larger than D2 preferably by 0.1 to 5 mm, and more preferably by 0.2 to 3 mm.

Next, as shown in FIG. 12B, the second section connection portion 62a and/or the second section connection portion 72a are displaced inward so that the distance between the second section connection portion 62a and the second section connection portion 72a becomes reduced. As a result, the distance D1 between the inner surface of the second section connection portion 62a and the inner surface of the second section connection portion 72a is changed to Dr. Here, the difference between D2 and Dr is preferably 0 to 0.2 mm.

In the state shown in FIG. 12B, a high energy beam such as a laser is irradiated on each of the second section connection portion 62a and the second section connection portion 72a. As a result, the second section 61b of the first positive electrode current collector 61 and the second section connection portion 62a of the second positive electrode current collector 62 are joined by welding, and the second section 71b of the first negative electrode current collector 71 and the second section connection portion 72a of the second negative electrode current collector 72 are joined by welding.

As shown in FIG. 12C, a joint portion 64, which is a welded portion between the second section 61b and the second section connection portion 62a, is formed in the recess 62d. Further, a joint portion 74, which is a welded portion between the second section 71b and the second section connection portion 72a, is formed in the recess 72d.

By following the procedure of FIGS. 12A to 12C, it is possible to more stably weld together the first positive electrode current collector 61 and the second positive electrode current collector 62, and also weld together the first negative electrode current collector 71 and the second negative electrode current collector 72, using a simpler method. Highly reliable joint portions 64 and 74 can therefore be formed.

Each of the parts where the recess 62d and the recess 72d are formed is a part thinner than its periphery. By performing welding so as to form each of the joint portions 64 and 74 in the thin part, a higher-quality joint portion can be formed more stably. A more reliable secondary battery can therefore be obtained. Further, by using the through hole 62e to detect presence or absence of a gap between the second section 61b and the second section connection portion 62a or to measure the size of the gap, the second section 61b and the second section connection portion 62a can more stably be joined by welding. This also applies to the through hole 72e.

Figure 13:
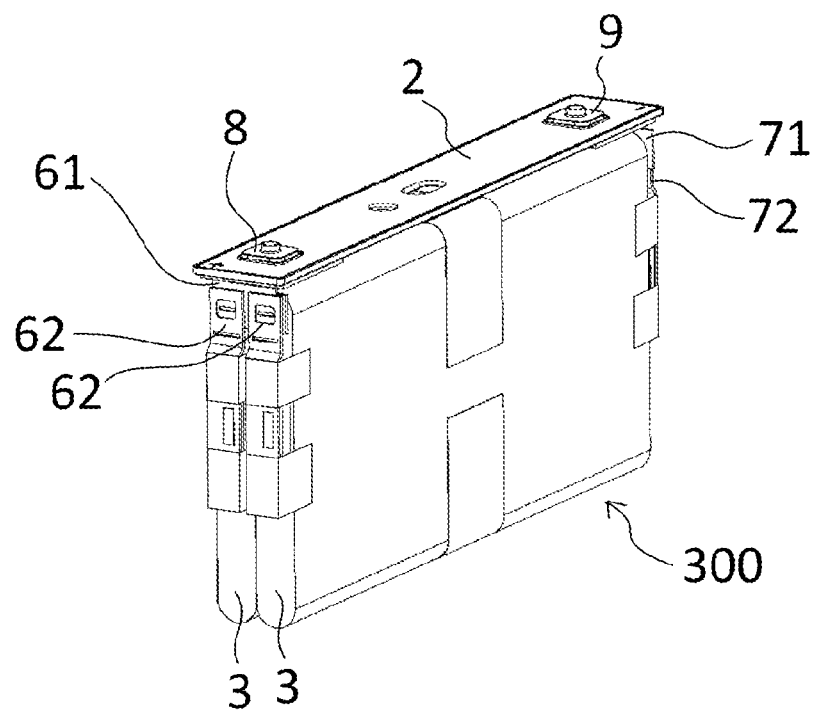
FIG. 13 is a perspective view of the sealing plate and the electrode assembly group after connecting the first positive electrode current collector to the second positive electrode current collector and connecting the first negative electrode current collector to the second negative electrode current collector.

FIG. 13 is a perspective view showing a state after connecting together the first positive electrode current collector 61 and the second positive electrode current collector 62 and connecting together the first negative electrode current collector 71 to the second negative electrode current collector 72, respectively.

[Electrode Assembly Holder]

Figure 14:
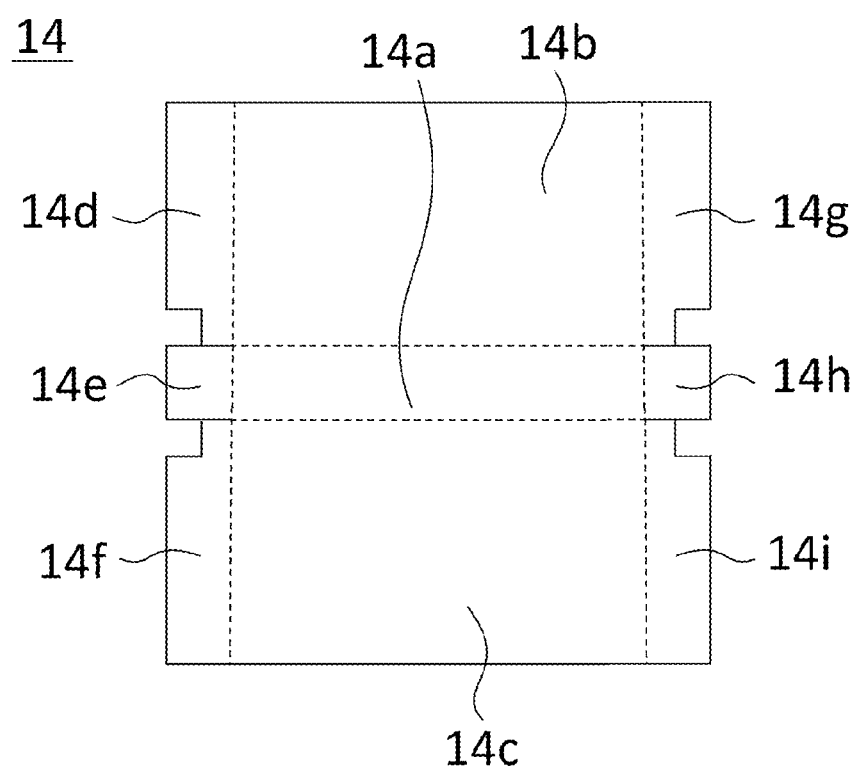
FIG. 14 is a developed view of an electrode assembly holder according to the embodiment.

FIG. 14 is a developed view of an electrode assembly holder 14. A box-shaped electrode assembly holder 14 is obtained by folding an insulating sheet that constitutes the electrode assembly holder 14 at parts indicated by dashed lines in FIG. 14. The electrode assembly holder 14 includes a holder bottom portion 14*a*, a holder first main surface 14*b*, a holder second main surface 14*c*, a holder first side surface 14*d*, a holder second side surface 14*e*, a holder third side surface 14*f*, a holder fourth side surface 14*g*, and a holder fifth side surface 14*h*, and a holder sixth side surface 14*i*.

When the electrode assembly holder 14 is formed into a box shape, the electrode assembly holder 14 includes a section where the holder first side surface 14*d*, the holder second side surface 14*e*, and the holder third side surface 14*f* are overlapped, and a section where the holder fourth side surface 14*g*, the holder fifth side surface 14*h*, and the holder sixth side surface 14*i* are overlapped.

With the electrode assembly group 300 placed in the box-shaped electrode assembly holder 14, the electrode assembly group 300 is inserted into the rectangular outer body 1. Then, the sealing plate 2 is joined to the rectangular outer body 1, so that the opening of the rectangular outer body 1 is sealed by the sealing plate 2. An electrolyte solution is injected inside via the electrolyte solution injection hole 15 provided in the sealing plate 2, and the electrolyte solution injection hole 15 is sealed by the sealing member 16. The secondary battery 20 is thereby obtained.

[Secondary Battery]

In the secondary battery 20 according to the embodiment, the positive electrode current collector 6 is configured to include the first positive electrode current collector 61 and the second positive electrode current collector 62. With this configuration, when bending the positive electrode tab group 40, the positive electrode tab group 40 can be bent without bending the positive electrode current collector 6, and a secondary battery having a high volumetric energy density can be obtained more stably by a simpler method. This advantage serves more effectively for cases where the number of electrode assemblies 3 housed in the battery housing 100 is two or more. According to the present disclosure, latitude regarding the number of electrode assemblies 3 housed in the battery housing 100 is enhanced. According to the present disclosure, even when the number of electrode assemblies 3 housed in the battery housing 100 is more than two, a highly reliable secondary battery can be manufactured stably without forming the positive electrode current collector 6 in a complicated shape. The present disclosure is particularly effective for cases where the number of electrode assemblies 3 housed in the battery housing 100 is more than two and is an odd number.

In the secondary battery 20, the tab connection portion 62*c* of the second positive electrode current collector 62 is arranged closer to the first side wall 1*b* of the rectangular outer body 1 than is the second section connection portion 62*a* of the second positive electrode current collector 62. With this configuration, the space between the first side wall 1*b* and the electrode assembly 3 can be utilized more effectively, so that the power generating part of the electrode assembly 3 can be made larger, and the secondary battery is configured to have a higher volumetric energy density. The above also applies to the second negative electrode current collector 72.

In the electrode assembly 3, the positive electrode tab group 40 is preferably located off-center toward the sealing plate 2. With this arrangement, the conductive path from the positive electrode tab group 40 to the positive electrode terminal 8 can be shortened, and the secondary battery 20 is configured to have a low internal resistance. In the electrode assembly 3, the negative electrode tab group 50 is preferably located off-center toward the sealing plate 2. With this arrangement, the conductive path from the negative electrode tab group 50 to the negative electrode terminal 9 can be shortened, and the secondary battery 20 is configured to have a low internal resistance.

Between a region where the second section 61*b* of the first positive electrode current collector 61 and the second section connection portion 62*a* of the second positive electrode current collector 62 are overlapped and the first side wall 1*b* of the rectangular outer body 1, it is preferable to provide an insulating member (not shown) other than the electrode assembly holder 14. Further, between a region where the second section 71*b* of the first negative electrode current collector 71 and the second section connection portion 72*a* of the second negative electrode current collector 72 are overlapped and the first side wall 1*c* of the rectangular outer body 1, it is preferable to provide an insulating member (not shown) other than the electrode assembly holder 14. With this configuration, even when an impact or vibration is applied to the secondary battery 20, it is possible to suppress any damages to joints between the respective components, the positive electrode tab group 40, or the negative electrode tab group 50.

Figure 15:
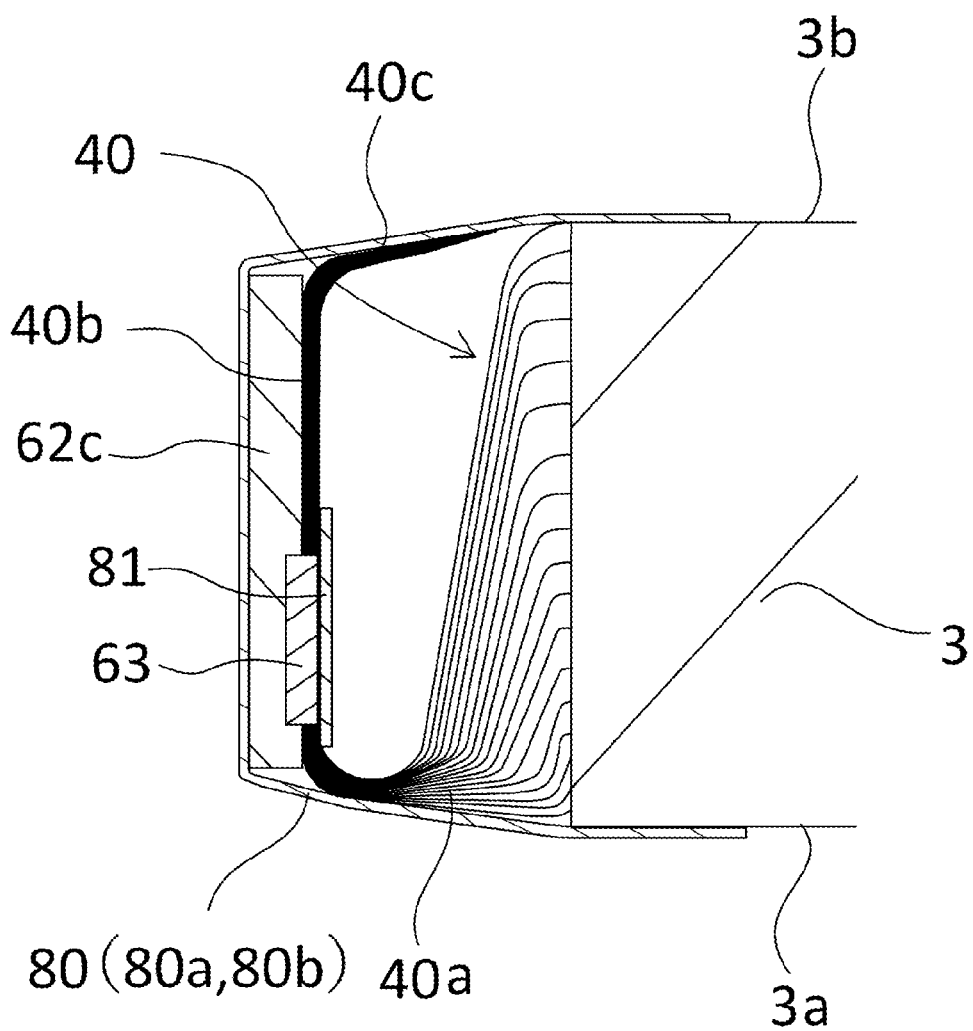
FIG. 15 is a cross-sectional view in another embodiment, showing the vicinity of a connecting portion between a second positive electrode current collector and a positive electrode tab group, and is a diagram showing a state in which the positive electrode tab group is bent and fixed.

FIG. 15 is a cross-sectional view in another embodiment, showing the vicinity of the joint portion 63 joining the tab connection portion 62*c* of the second positive electrode current collector 62 and the positive electrode tab group 40, and is a diagram showing a state in which the positive electrode tab group 40 is bent and fixed. As shown in FIG. 15, the part where the joint portion 63 is formed on the tab connection portion 62*c* of the second positive electrode current collector 62 can be covered with the tape 80. Even when burrs and metal powder which may generate during formation of the joint portion 63 are present at the part where the joint portion 63 is formed on the tab connection portion 62*c* of the second positive electrode current collector 62, movement of the burrs and metal powder can be suppressed by the tape 80.

Further, as shown in FIG. 15, the part of the positive electrode tab group 40 where the joint portion 63 is formed can be covered with a tape 81. Even when burrs and metal powder which may generate during formation of the joint portion 63 are present at the part of the positive electrode tab group 40 where the joint portion 63 is formed, movement of the burrs and metal powder can be suppressed by the tape 81. The tape 81 is attached preferably before the positive electrode tab group 40 is bent.

It is possible to apply an adhesive or attach an adhesive material to the part where the joint portion 63 is formed on the tab connection portion 62*c* of the second positive electrode current collector 62 and/or the part of the positive electrode tab group 40 where the joint portion 63 is formed. Further, the part where the joint portion 63 is formed on the tab connection portion 62*c* of the second positive electrode current collector 62 and/or the part of the positive electrode tab group 40 where the joint portion 63 is formed can be covered with a heat-sealing resin. The same configuration can be employed for the tab connection portion 72*c* of the second negative electrode current collector 72 and the negative electrode tab group 50.

In the secondary battery 20 according to the above-described embodiment, one second positive electrode current collector 62 and one second negative electrode current collector 72 are mounted to a single electrode assembly 3. However, the present disclosure is not limited to this configuration. A plurality of second positive electrode current collectors and/or a plurality of second negative electrode current collectors can be mounted to a single electrode assembly 3. A further embodiment in which a plurality of second positive electrode current collectors are mounted to a single electrode assembly 3 will now be described. Using the same method, a plurality of second negative electrode current collectors can be mounted to a single electrode assembly 3. Description regarding parts of the further embodiment that are common to the secondary battery 20 of the above-described embodiment will not be repeated.

Figure 16:
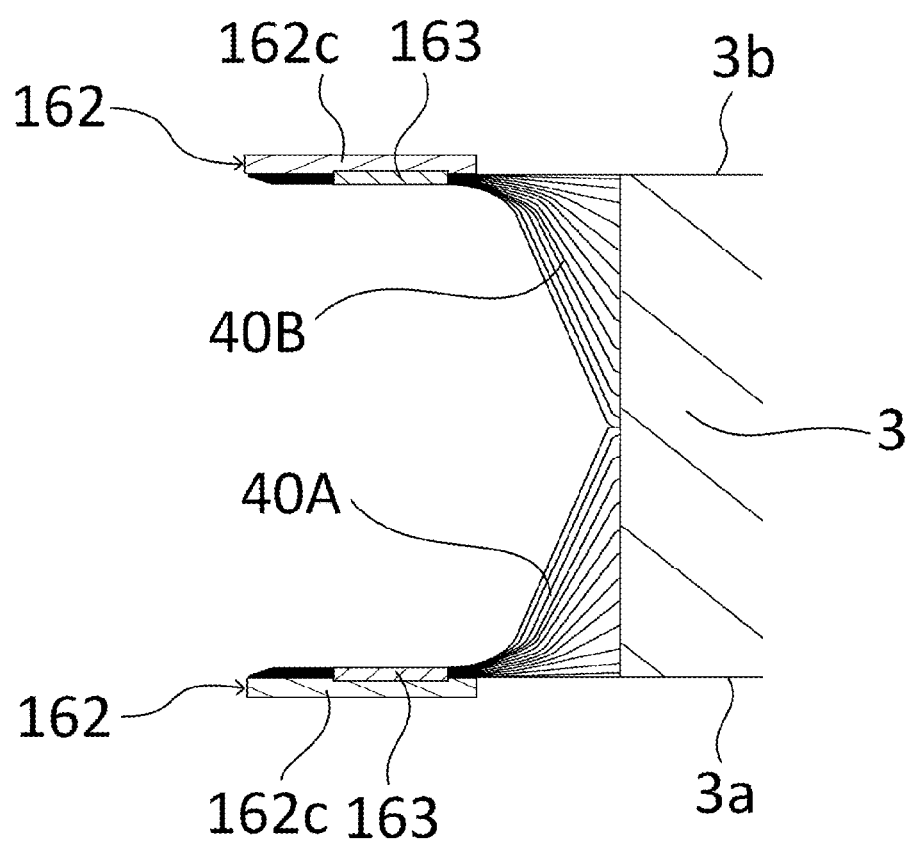
FIG. 16 is a cross-sectional view in a further embodiment, showing a state in which positive electrode tab groups are connected to second positive electrode current collectors.

As shown in FIG. 16, the positive electrode tab group 40 is divided into two groups, and to each of one positive electrode tab group 40A and the other positive electrode tab group 40B which resulted from the division into two groups, a tab connection portion 162c of a second positive electrode current collector 162 is connected by welding to thereby form a joint portion 163. It is preferable that the one positive electrode tab group 40A is gathered on the first main surface 3a side and the other positive electrode tab group 40B is gathered on the second main surface 3b side. The second positive electrode current collectors 162 can have the same configuration as the second positive electrode current collector 62 according to the above-described embodiment.

Figure 17:
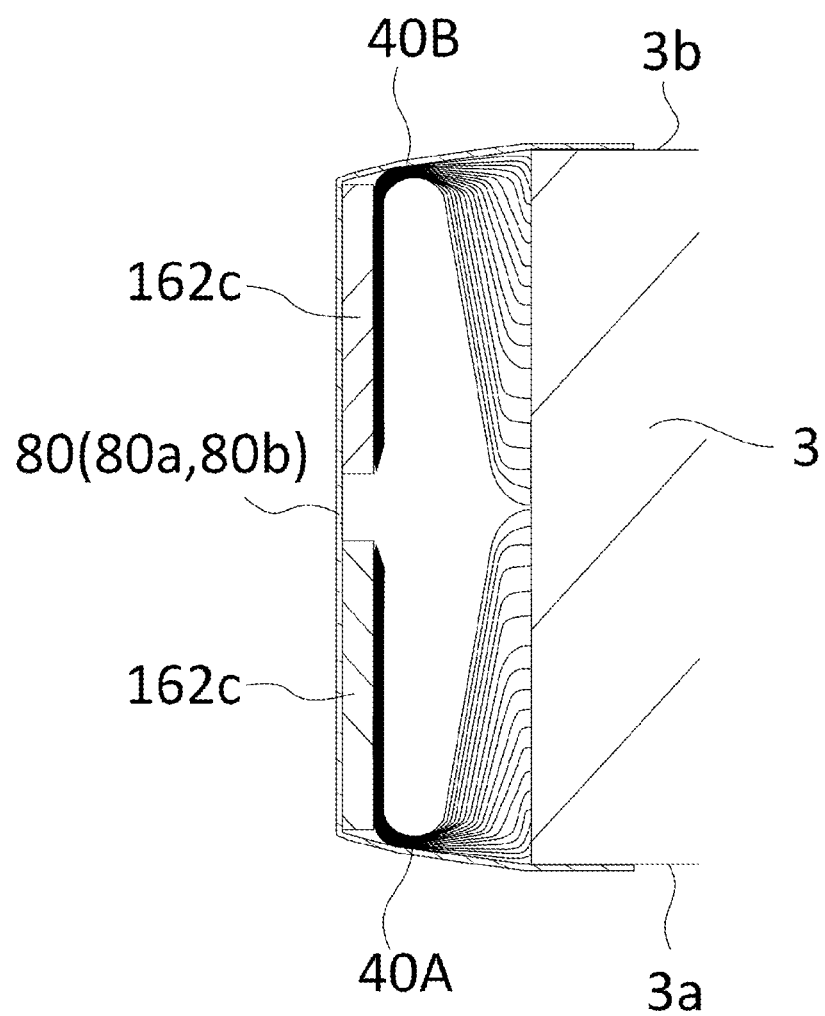
FIG. 17 is a cross-sectional view in the further embodiment, showing the vicinity of the connecting portions between the second positive electrode current collectors and the positive electrode tab groups, and is a diagram showing a state in which the positive electrode tab groups are bent and fixed.

As shown in FIG. 17, the positive electrode tab group 40A bundled on the first main surface 3a side is bent toward the center in the thickness direction of the electrode assembly 3, and the positive electrode tab group 40B bundled on the second main surface 3b side is bent toward the center in the thickness direction of the electrode assembly 3. While in the bent state, the positive electrode tab groups 40A and 40B are fixed by the tape 80 that serves as the fixing means.

Figure 18:
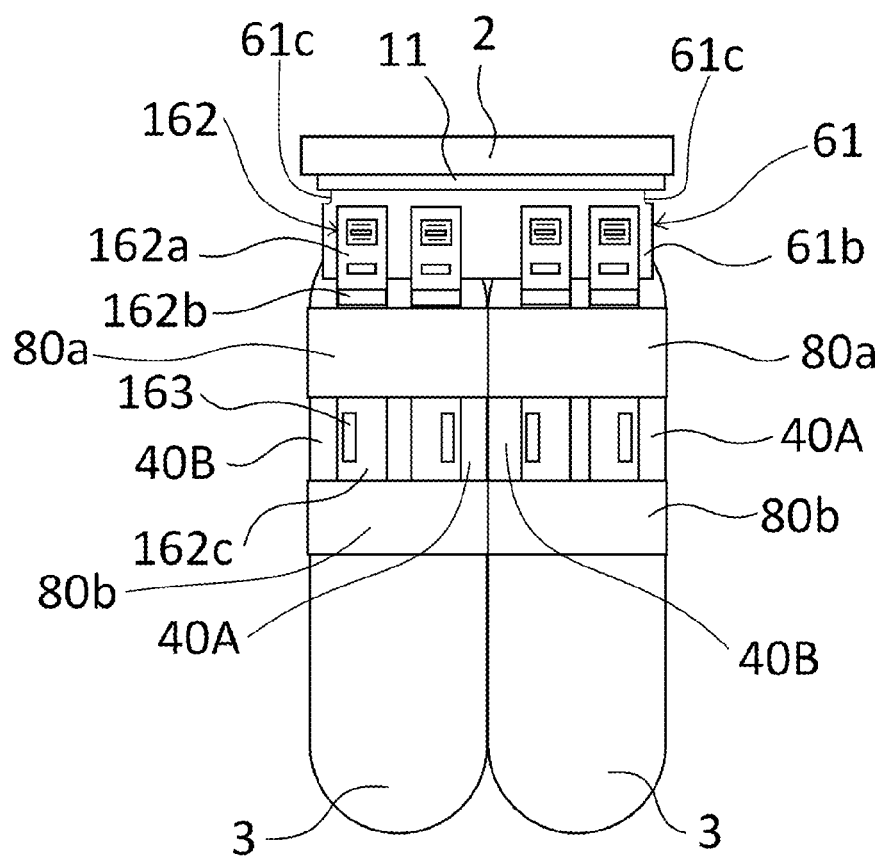
FIG. 18 is a diagram showing a state in which the second positive electrode current collectors are connected to the first positive electrode current collector in the further embodiment.

As shown in FIG. 18, in one electrode assembly 3, the second positive electrode current collector 162 connected to the positive electrode tab group 40A and the second positive electrode current collector 162 connected to the positive electrode tab group 40B are connected to the first positive electrode current collector 61 by welding. Each of the second positive electrode current collectors 162 has a second section connection portion 162a, a sloped portion 162b, and a tab connection portion 162c. The second section connection portion 162a is connected to the second section 61b of the first positive electrode current collector 61. The configuration of this further embodiment is particularly effective for cases in which the thickness of one electrode assembly 3 is increased.

[Other Points]

Although the above-described embodiments refer to an example in which the electrode assembly is a spiral electrode assembly formed by winding a positive electrode plate and a negative electrode plate with a separator disposed between the electrodes, the present disclosure is not limited to this configuration. It is also possible to use a laminated electrode assembly including a plurality of positive electrode plates and a plurality of negative electrode plates.

Although the above-described embodiments refer to an example in which the spiral electrode assembly is produced by winding a positive electrode plate having a plurality of positive electrode tabs formed thereon and a negative electrode plate having a plurality of negative electrode tabs formed thereon, the present disclosure is not limited to this configuration. The positive electrode tab group or the negative electrode tab group can alternatively be formed by cutting on an exposed portion of the positive electrode core or the negative electrode core that is wound in the spiral electrode assembly.

Although the above-described embodiments refer to an example in which each of the positive electrode current collector 6 and the negative electrode current collector 7 is composed of two components, each of the positive electrode current collector 6 and the negative electrode current collector 7 may alternatively be composed of a single component.

Known materials can be used for the positive electrode plate, the negative electrode plate, the separator, the electrolyte, and the like.

The above-mentioned aluminum is assumed to include aluminum and aluminum alloys mainly composed of aluminum. The above-mentioned copper is assumed to include copper and copper alloys mainly composed of copper. The above-mentioned iron is assumed to include iron alloys mainly composed of iron. The above-mentioned nickel is assumed to include nickel alloys mainly composed of nickel.

The tape preferably is an element comprising a base material and an adhesive layer formed on the base material. The base material is preferably composed of polyethylene, polypropylene, polyester, nylon, vinyl chloride, Teflon (registered trademark), polyimide, Kapton (registered trademark), polyphenylene sulfide, polyethylene naphthalate, or the like. The material of the adhesive layer is preferably composed of an acrylic-based adhesive, a silicon-based adhesive, a rubber-based adhesive, or the like. However, the present disclosure is not limited to the above-listed materials. The adhesive layer preferably has an adhesive property at room temperature.

Although an example in which the fixing means is a tape is described above as an embodiment, the present disclosure is not limited to this configuration. As the fixing means, a resin frame, a metal frame, a ceramic frame, a clip-shaped member, or the like may be contemplated. A tape is more preferable as the fixing means.

A pressure-sensitive current cutoff mechanism can be provided in the conductive path between the positive electrode tab group and the positive electrode terminal, or in the conductive path between the negative electrode tab group and the negative electrode terminal. This current cutoff mechanism is a mechanism that operates, when the pressure inside the battery housing exceeds a predetermined value, to disconnect the conductive path between the positive electrode tab group and the positive electrode terminal or the conductive path between the negative electrode tab group and the negative electrode terminal, and thereby cut off a flow of electric current.

REFERENCE SIGNS LIST 20 secondary battery
100 battery housing
1 rectangular outer body
1a bottom portion
1b, 1c first side wall
1d, 1e second side wall
2 sealing plate
3 electrode assembly
3a first main surface
3b second main surface
300 electrode assembly group
4 positive electrode plate
4a positive electrode active material layer 4b positive electrode tab
4c positive electrode protective layer
40 positive electrode tab group
40a base section
40b contact section
40c tip section
5 negative electrode plate
5a negative electrode active material layer
5b negative electrode tab
50 negative electrode tab group
6 positive electrode current collector
61 first positive electrode current collector
61a first section
61b second section
61c notch
62 second positive electrode current collector
62a second section connection portion
62b sloped portion
62c tab connection portion
62d recess
62e through hole
62f fuse portion
62g fuse hole
63, 64 joint portion
7 negative electrode current collector
71 first negative electrode current collector
71a first section
71b second section
71c notch
72 second negative electrode current collector
72a second section connection portion
72b sloped portion
72c tab connection portion
72d recess
72e through hole
74 joint portion
8 positive terminal
9 negative terminal
10, 12 outer side insulating member
11, 13 inner side insulating member
14 electrode assembly holder
14a holder bottom portion
14b holder first main surface
14c holder second main surface
14d holder first side surface
14e holder second side surface
14f holder third side surface
14g holder fourth side surface
14h holder fifth side surface
14i holder sixth side surface
15 electrolyte solution injection hole
16 sealing member
17 gas discharge valve
80 tape
80a first tape
80b second tape
81 tape
90 electrode assembly fixing means
40A, 40B positive electrode tab group
162 second positive electrode current collector
162a second section connection portion
162b sloped portion
162c tab connection portion
163 joint portion

The invention claimed is:

1. A secondary battery, comprising:
an electrode assembly including a positive electrode plate and a negative electrode plate;
a rectangular outer body that has an opening and houses the electrode assembly;
a sealing plate that seals the opening; and
a terminal attached to the sealing plate, wherein
the electrode assembly has a positive electrode tab group at one end and a negative electrode tab group at the other end;
the rectangular outer body has a bottom portion, a pair of first side walls arranged to face each other, and a pair of second side walls arranged to face each other;
one of the positive electrode tab group or the negative electrode tab group is electrically connected to the terminal by a first current collector and a second current collector;
the first current collector includes a first section arranged between the sealing plate and the electrode assembly, and a second section which is bent from an end of the first section and arranged between one of the first side walls and the electrode assembly;
the one of the positive electrode tab group or the negative electrode tab group is connected in a bent state to the second current collector; and
the second current collector is welded to the second section.

2. The secondary battery according to claim 1, wherein
the secondary battery includes the electrode assembly in a plural number, and
a plurality of second current collectors, each being said second current collector and being connected to the positive electrode tab group or the negative electrode tab group of a corresponding one of the electrode assemblies, are welded to the second section of the first current collector.

3. The secondary battery according to claim 1, wherein:
the positive electrode tab group or the negative electrode tab group provided in one said electrode assembly is divided into a plurality of parts;
a plurality of second current collectors, each being said second current collector, are provided, which are connected to the respective divided parts of the positive electrode tab group or the negative electrode tab group; and
the plurality of second current collectors are welded to the second section of the first current collector.

4. The secondary battery according to claim 1, wherein:
the second current collector includes a second section connection portion and a tab connection portion;
the second section connection portion is welded to the second section;
the one of the positive electrode tab group or the negative electrode tab group is connected to the tab connection portion; and
a distance between the one of the first side walls and the tab connection portion is smaller than a distance between the one of the first side walls and the second section connection portion.

5. The secondary battery according to claim 1, wherein:
a recess is provided in the second current collector;
a through hole is provided inside the recess; and
in an interior of the recess, the second current collector is welded to the second section.

6. The secondary battery according to claim 1, wherein:
the second current collector has a plate-shaped section arranged along the one of the first side walls; and
the one of the positive electrode tab group or the negative electrode tab group is connected to a surface of the plate-shaped section located toward the electrode assembly.

7. The secondary battery according to claim 1, wherein notches are provided at both ends, in a width direction, of the second section.

8. The secondary battery according to claim 1, wherein in the second current collector, a fuse portion is provided between a welded portion in which the second current collector and the second section are welded together and a joint portion joining the second current collector and the one of the positive electrode tab group or the negative electrode tab group.

9. The secondary battery according to claim 1, wherein at least one of the positive electrode tab group and the negative electrode tab group is provided in the electrode assembly at a position off-centered toward the sealing plate.

10. A method for manufacturing a secondary battery, the secondary battery comprising:
an electrode assembly including a positive electrode plate and a negative electrode plate;
a rectangular outer body that has an opening and houses the electrode assembly;
a sealing plate that seals the opening; and
a terminal attached to the sealing plate, wherein
the electrode assembly has a positive electrode tab group at one end and a negative electrode tab group at the other end;
the rectangular outer body has a bottom portion, a pair of first side walls arranged to face each other, and a pair of second side walls arranged to face each other; and
one of the positive electrode tab group or the negative electrode tab group is electrically connected to the terminal by a first current collector and a second current collector,
the method comprising the steps of:
attaching the first current collector to the sealing plate;
connecting the positive electrode tab group or the negative electrode tab to the second current collector;
bending the one of the positive electrode tab group or the negative electrode tab group and changing an orientation of the second current collector connected to the one of the positive electrode tab group or the negative electrode tab group; and
welding the second current collector having the one of the positive electrode tab group or the negative electrode tab group connected thereto to the first current collector attached to the sealing plate.

11. The secondary battery manufacturing method according to claim 10, wherein:
the first current collector includes a first section to be arranged between the sealing plate and the electrode assembly, and a second section which is bent from an end of the first section and is to be arranged between one of the first side walls and the electrode assembly; and
the second current collector having the one of the positive electrode tab group or the negative electrode tab group connected thereto is to be welded to the second section.

12. The secondary battery manufacturing method according to claim 11, wherein:
a recess is provided in the second current collector;
a through hole is provided inside the recess; and
the second current collector is to be welded to the second section by irradiating a high-energy beam to an interior of the recess.

13. The secondary battery manufacturing method according to claim 11, wherein:
notches are provided at both ends, in a width direction, of the second section; and
the second current collector is to be welded to the second section while the notches are gripped.

14. The secondary battery manufacturing method according to claim 11, wherein:
the terminal is a negative electrode terminal;
the first current collector is a first negative electrode current collector;
the first section is a negative electrode first section;
the second section is a negative electrode second section;
the second current collector is a second negative electrode current collector;
the secondary battery further comprises a first positive electrode current collector and a second positive electrode current collector;
the first positive electrode current collector includes a positive electrode first section to be arranged between the sealing plate and the electrode assembly, and a positive electrode second section to be arranged between the other one of the first side walls and the electrode assembly;
the method further comprises the steps of:
attaching the first positive electrode current collector to the sealing plate;
connecting the positive electrode tab group to the second positive electrode current collector;
bending the positive electrode tab group and changing an orientation of the second positive electrode current collector connected to the positive electrode tab group;
arranging such that the positive electrode second section of the first positive electrode current collector attached to the sealing plate and the negative electrode second section of the first negative electrode current collector attached to the sealing plate are located between the second positive electrode current collector having the positive electrode tab group connected thereto and the second negative electrode current collector having the negative electrode tab group connected thereto;
reducing a distance between the second positive electrode current collector and the second negative electrode current collector; and
welding together the positive electrode second section and the second positive electrode current collector, and welding together the negative electrode second section and the second negative electrode current collector.

* * * * *